INVENTORS
ALAIN PROFIT & RAYMOND A. CHOLLET
BY
Abraham A. Saffitz
ATTORNEY

INVENTORS
ALAIN PROFIT & RAYMOND A. CHOLLET
BY
Abraham A. Saffitz
ATTORNEY

INVENTORS
ALAIN PROFIT & RAYMOND A. CHOLLET
BY
Abraham A. Saffitz
ATTORNEY

INVENTORS
ALAIN PROFIT & RAYMOND A. CHOLLET
BY
Abraham A. Saffitz
ATTORNEY

United States Patent Office 3,454,928

Patented July 8, 1969

3,454,928

SYSTEM OF PROGRAMMED WORKING FOR SPACE TELECOMMUNICATION STATION

Alain Profit, 33 Rue Poliveau, 5 Paris, France, and Raymond A. Chollet, 5 Rue Besson, Arcueil, France Filed Nov. 22, 1965, Ser. No. 508,917
Claims priority, application France, Nov. 25, 1964, 996,316
Int. Cl. H04q 9/00
U.S. Cl. 340—172.5 5 Claims The present invention relates to a system of programmed working for a space telecommunication station using passing satellites, capable of ensuring continuous communication by the successive use of a plurality of tracking aerials.

Such working presupposes, apart from the existence of a network of satellites, of which the times of simultaneous visibility afford sufficient coverage for the proposed communications, on the one hand knowledge of the ephemerides of each of the satellites to be used, and on the other hand the setting up of a common programme for the allocation of the satellites to the communications and of a specific programme for each station for the allocation of its means to the communications for which it is responsible.

According to the invention, the horizontal co-ordinates of the satellites visible from each station are calculated for each of them at regular intervals, for example of five minutes, suitably staggered, and recorded chronologically in blocks, in duplicate, on four tracks of two punched tapes with five tracks, of which the fifth is used for a parity check, to constitute the programme of co-ordinates for each station; the chronological list of the actions to be carried out at each station, both for the acquisition of the various satellites and for the switching over of the modulation channels is recorded in the same manner to constitute the working programme of said station. In each station, the two copies of each of said programmes of co-ordinates and of working are read simultaneously in real time by readers capable of progressing in both directions in such a manner as to permit repetitions in limited numbers of the reading of the blocks which do not agree or which suffer from parity errors, each of the readers for each programme enabling its working to be continued. The programme of co-ordinates is read block by block, a sufficient time, for example thirty seconds, before the time of application of the co-ordinates expressed in each block for the satellite designated therein, in order to permit the acquisition of this satellite by the tracking aerial provided in the working programme. The transfer of relay satellite between two stations is not programmed except insofar as it relates to the setting up of the second communication in parallel with the first, the cutting off of this being controlled by signals exchanged between the two stations. A main desk collates all the signals and alarms relating to the state of station and the controls enabling a satellite to be allocated manually to an aerial, the transmission of the acquisition data to an aerial unit and the switching over of the modulation channels.

The invention will be better understood on reading the following description and examining the accompanying drawings in which:

FIGURE 1 is a basic diagram of the general organisation of a programmer having a plurality of tracking aerials at its disposal.

Figure 1:
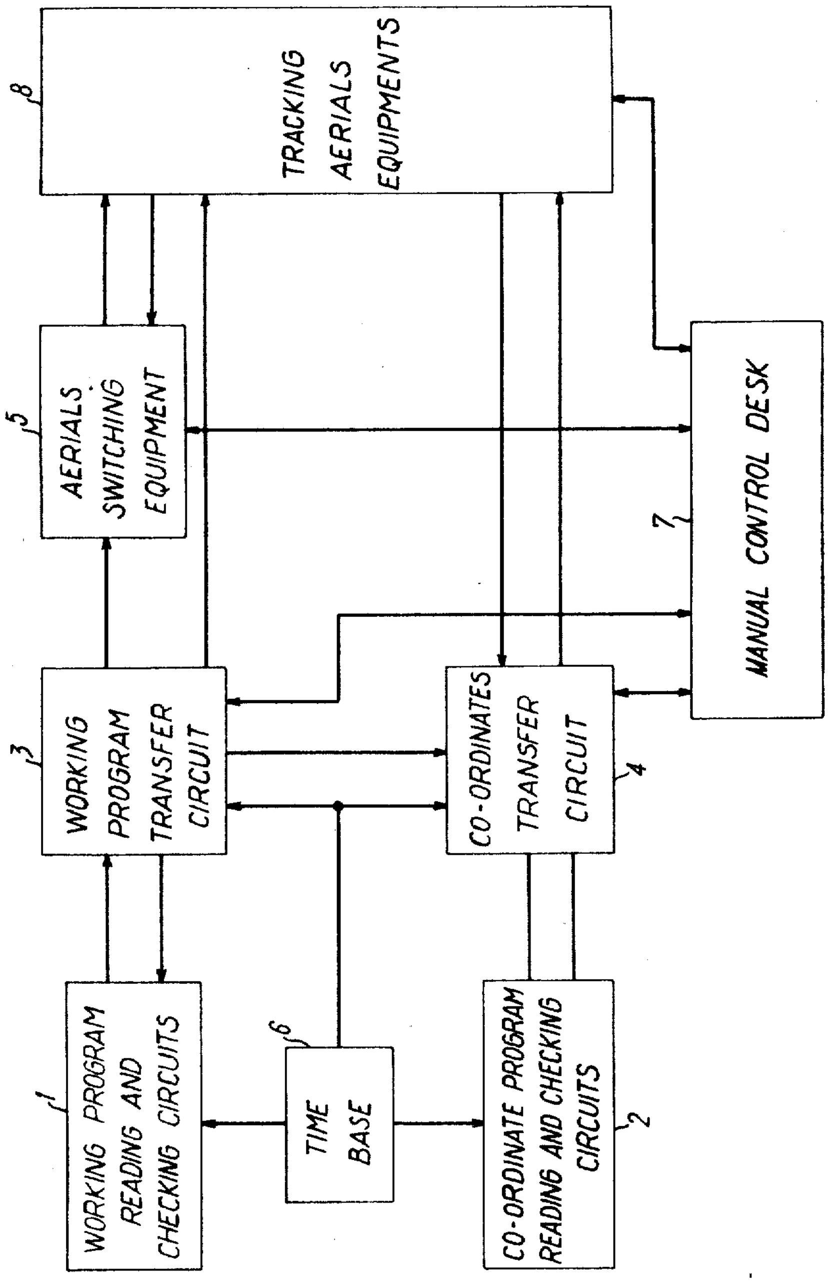
FIGURE 1 is a general block diagram of a programmer according to the invention.

The data necessary for the operation of the programmer are, on the one hand those which define its working programme and on the other hand those which relate to the co-ordinates of the satellites visible from the station. These data are recorded in coded form on punched paper tape with five tracks which enables them to be transmitted over the telex network. Since one of the tracks is reserved for a parity check, four tracks are available for the recording of information, that is to say sixteen different combinations.

The working and co-ordinate programmes are respectively supplied, in duplicate, to two sub-assemblies 1 and 2 for reading and control. A sub-assembly 3 comprises the members necessary for the transfer, under the control of a time base 6, depending on the clock of the space station, of the orders and instructions read in the sub-assembly 1, on the one hand with regard to the designation of a satellite to be acquired, of the aerial to be used for this acquisition and of the connections to be established between the aerials and the ground network, to switching equipment 5, and on the other hand, with regard to the remote-control of the aerials, to a sub-assembly 8 comprising transmission equipment as well as acquisition and tracking equipment. A sub-assembly 4 ensures the transfer of the co-ordinates read by the sub-assembly 2 to the acquisition and tracking equipment of the sub-assembly 8, under the double control of the sub-assembly 3 and of the time base 6. A desk 7 collects, on the one hand signals enabling the state of the station and of the alarms to be known at every moment, whether these are minor ones associated with incidents which do not immediately comprise the operation of the assembly, or major ones which demand rapid intervention, and on the other hand the controls necessary for the manual interventions enabling, in particular, the acquisition of a given satellite by a selected aerial to be effected, and the switching over of the ground connections to the transmission equipment of the sub-assembly 8 to be effected.

Figure 2:
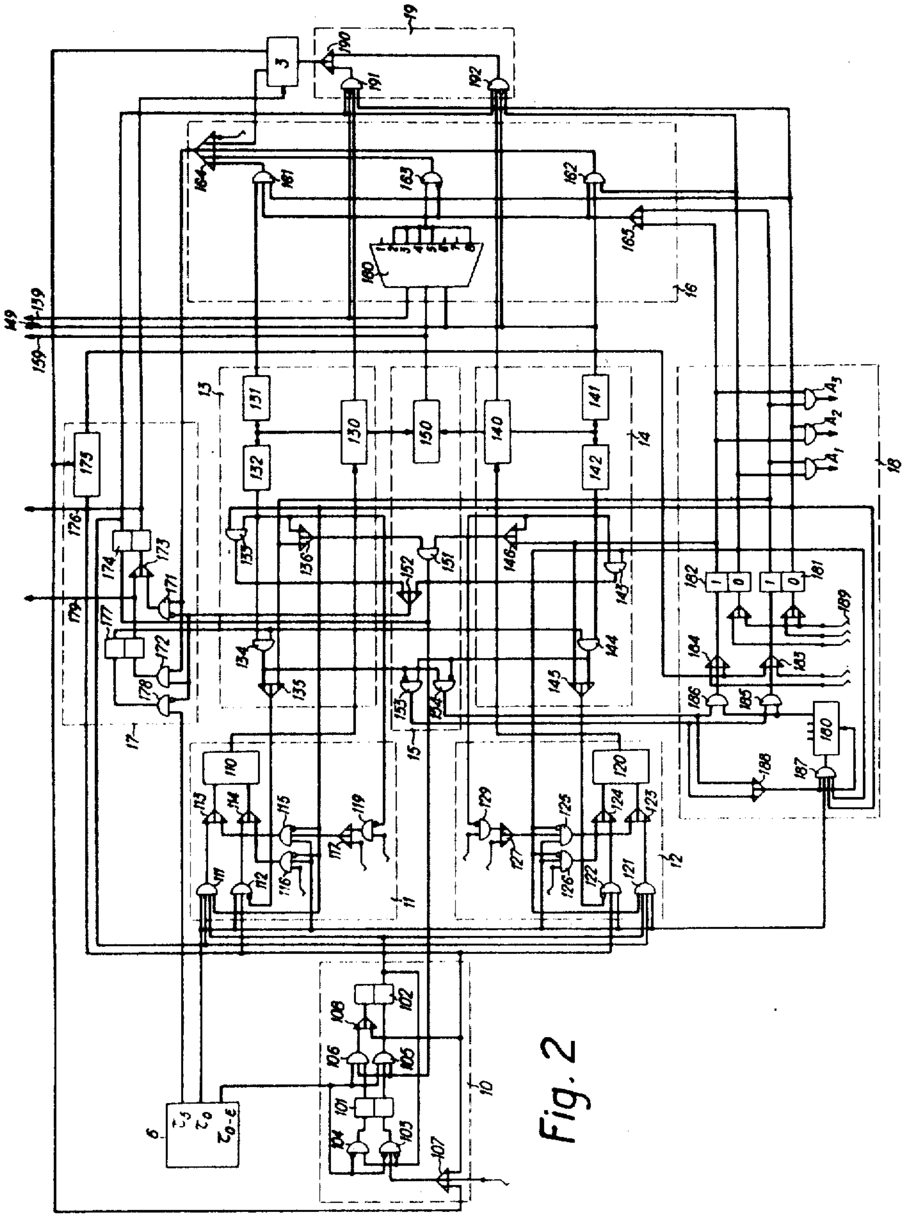
FIGURE 2 is a functional diagram of a programme-reading device in the programmer of FIGURE 1.

FIGURE 2 illustrates the sub-assembly 1 for reading and checking the working programme.

This programme is supplied in duplicate to the sub-assembly 1 in the form of two identical punched tapes. It is divided into blocks, each of which comprises:

A particular combination serving as a reference for the head of the block;

Six numerical combinations enabling the digits of the tens and of the units of the hours, minutes and seconds designating the moment of carrying out of the order included in the block to be expressed respectively;

A numerical combination designating one of the four tracking aerials;

A selected combination out of three particular combinations designating the nature of the order to be carried out namely:

order A: order for the acquisition of a satellite
order B: order for connection to ground network
order C: order for various remote controls Two numerical combinations respectively expressing the digit for the tens and the digit for the units of the number characterizing the order to be carried out.

It will be seen that one block of the working programme consists of eleven rows of perforations which represents substantially three centimeters of punched tape and a reading time of about 137 milliseconds for an analysis at the frequency of twenty-four combinations per second. Only fifteen combinations are used, the reference combination for the head of the block, the ten numerical combinations, three combinations for the nature of the order and an error combination.

The reading and checking device 1 for the working programme operates in reading cycles initiated by a signal supplied under the control of the time base 6 through the device 3 for the transfer of the working programme, as soon as this is available and which comprises the reading of all the successive combinations of a programme block at a rate fixed by the time base 6. The latter supplies the device 1 with pulses $\tau_0$, $\tau_5$ and $\tau_{0-\epsilon}$ respectively at the moments zero, five milliseconds and about 12.4 milliseconds in consecutive cycles of 12.5 milliseconds in the course of each of which a combination of the working programme can be processed.

The reading and checking device 1 consists of a circuit 10 for starting and stopping the reading cycle, two identical parallel channels which comprise two reading circuits 11, 12 reading, in synchronism, the two identical punched tapes on which is recorded the working programme and two checking circuits 13, 14 respectively, a group of comparison circuits 15 for the states of the circuits 13, 14, a circuit 16 controlling the repetition reading, a reading-repetition circuit 17, a circuit 18 for supervising the operation of the readers and an output circuit 19.

The circuit 10 for starting and stopping the reading cycle comprises two trigger circuit 101 and 102 in series, of which the setting and resetting inputs are controlled respectively by inhibit gates 103, 104 and "AND" gates 105, 106. The gate 103 permits the setting of the trigger 101 through a starting signal for the reading cycle arriving through an "OR" gate 107, either from the transfer device 3, or from the reading-repetition circuit 17, or from a manual control, provided that the trigger 102 is in the normal position and except during the pulse $\tau_{0-\epsilon}$ of the time base 6. The gates 105, 106 each have three inputs, the first being respectively connected to the operative and inoperative outputs of the trigger 101, the second to an output of the comparison circuits 15, and the third to the output $\tau_{0-\epsilon}$ of the time base 6. The trigger 102 can thus be set or confirmed in the same state as the trigger 101 by a pulse $\tau_{0-\epsilon}$. The gate 104 ensures a resetting of the trigger 101 at the end of the pulse $\tau_{0-\epsilon}$ which set the trigger 102. The starting signal for the reading cycle which originates from the reading-repetition circuit 17 resets the trigger 102 by means of an "AND" gate 108, which is likewise connected to the output of the gate 106. Thus the trigger 101 cannot change its state for the duration of the control pulse $\tau_{0-\epsilon}$ of the trigger 102 and each fresh reading cycle is initiated by the setting of the trigger 102 immediately before its initial moment $\tau_0$.

Since the two reading circuits 11, 12 on the one hand and the two checking circuits 13, 14 on the other hand are identical, their homologous elements are designated by reference numerals which only differ in their tens digit.

The reading circuit 11 comprises a reader 110, for example with photo-electric cells, which reads, in parallel, the five elements of the combinations recorded on one of the copies of the punched tape on which the working programme is recorded and causes this tape to move forwards or backwards on each pulse $\tau_0$ reaching it through one of the gates 111 or 112, and the reader 120 siimlar reads, in synchronism, the second copy of the same programme in the same sense because of the gates 121, 122, the four gates 111, 112, 121, 122 each having an input connected to the support $\tau_0$ of the time base 6. The gates 111 and 121 which control the forward travel of the punched tapes are "AND" gates with four inputs, having their second input connected to the operative output of the trigger 102, their third input under the control of the reading-repetition circuit 17 and their fourth input under the control of the supervisory circuit 18. The gates 112 and 122 which control the backward travel of the punched tapes are inhibit gates with three inputs having their second input subject to the control of the reading-repetition circuit 17 and their inhibit input subject to the control of the corresponding circuit 13 or 14. The gates 111, 121 are connected to the forward-travel inputs of the readers 110, 120 by means of "OR" gates 113, 123 enabling the forward travel of these readers to be controlled manually under the control of a set of gates 115, 117, 119. The gates 112, 122 are connected to the backward-travel inputs of the readers 110, 120 by means of "OR" gates 114, 124 enabling the backward travel of these readers to be controlled manually under the control of the gates 116, 126.

The checking circuit 13 comprises a register 130 with five bistable elements in which there is recorded, at every moment, the combination being read by the reader 110 and with which there are associated a circuit 131 for checking the odd parity of each combination and a detector 132 for the particular combination serving as a reference for the head of the block. The output of the register 130 is connected to the output circuit 19. The odd-parity-circuit 131 delivers an error signal to the reading-repetition-control circuit 16 and to the output circuit 19, as well as to an error-signalling circuit, not illustrated, through a wire 139, when the combination recorded in the register 130 does not have the required parity, for example when it is even. When the reference for the head of a block is present in the register 130, the detector for this combination 132 supplies a signal which is applied to one input of an "AND" gate 133, the second input of which is subject to the control of the supervisory circuit 18, to one input of an "AND" gate 134, the second input of which is subject to the control of the reading-repetition circuit 17, to one input of an "OR" gate 136 and to the inhibit input of the gate 119 for the manual control of the forward travel of the reader 110 up to the first reference for the head of the block. The output of the gate 134 is connected by means of an "OR" gate 135 to the inhibit input of the gate 112.

The comparison circuits 15 comprises:

A coincidence detector 150 which compares the combinations recorded in the register 130 and in its homologue 140 and which, when these combinations are not identical with one another, supplies an error signal, on the one hand to the reading-repetition control circuit 16, and on the other hand to an error-signalling circuit, not illustrated, through a wire 159, An "AND" gate 151 with two inputs connected respectively to the outputs of the "OR" gate 136 and of its homologue 146 and the output of which is connected on the one hand to the reading-repetition circuit 17, and on the other hand to the release inputs for the gates 105, 106, An "OR" gate 152, the two inputs of which are connected respectively to the outputs of the gate 133 and of its homologue 143, and the output of which is connected to the reading-repetition circuit 17, And two inhibit gates 153, 154, the first of which has its inhibit input connected to the output of the gate 134 and its other input to the output of the homologue gate 144, while the input connections of the second are reversed, the outputs of the gates 153, 154 being connected to the supervisory circuit 18.

The reading-repeition control circuit 16 comprises a decoder 160 having three inputs respectively connected to the outputs of the coincidence detector 150, of the odd-parity checking circuit 131 and its homologue 141, three reading-repetition control gates 161, 162, 163, having first inputs connected respectively to the outputs of the circuits 131, 133 and of the decoder 160 and their outputs connected, by means of an "OR" gate 164, to the reading-repetition control gates 161, 162, 163, having their ing two inputs connected to two outputs of the supervisory circuit 18 and the output of which is connected to an inhibit input of the gate 163 and to two release inputs of the gates 161, 162. These each have another release input subject to the control of the circuit 18. The gate 164 has two other inputs, respectively connected to an output of the transfer circuits 130 and a manual control.

The purpose of the decoder 160 is to supply a signal to the gate 163 every time it receives an error signal from at least one of the three circuits 150, 131, 141, except in the case where it receives a signal simultaneously from the coincidence detector 150 and from one of the odd-parity checking circuits 131, 141 to the exclusive of the other, because in this case the combination supplied by the reading channel the odd-parity check of which has been satisfactory is considered exact. As will be seen later ,the gate 163 is inhibited when one of the two readers is not in service and in this case, only that one of the gates 161, 162 which corresponds to the reading channel in service is released.

The reading-repetition circuit 17 comprises two input gates 171, 172 which receive, in parallel, the signals leaving the gate 164, the first being inhibited and the second released when a signal is present in the output of the "OR" gate 152. The output of the gate 171 is connected by means for an "OR" gate 173 to the setting inputs of a trigger 174, the operative output of which is connected to the transfer circuit 3, to a release input of each of the gates 112, 122, to one input of each of the gates 107, 108, to the stepping input of the counter 175 and, through a wire 176, to a recording or signalling device not illustrated. The counter 175 supplies a signal when it reaches the number 3. It is restored to zero by each starting signal for a reading cycle originating from the transfer circuit 3. The resetting input of the trigger 174 is connected to the output of the gate 151. The inoperative output of the trigger 174 is connected to the output circuit 19 and to a release input of each of the gates 111, 121.

The output of the gate 172 is connected to the setting input of a trigger 177, the operative output of which is connected to the setting input of the trigger 174 by means of the "OR" gate 173 and, through a wire 179, to a recording or signalling device, not illustrated. The resetting input of the trigger 177 is controlled by an inhibit gate 178 having an input connected to the output $\tau_5$ of the time base 6 and an inhibit input connected to the output of the gate 151. The inoperative output of the trigger 177 is connected to the release inputs of the gates 134, 144.

The supervisory circuit 18 for the readers consists essentially of two triggers 181, 182 which respectively demonstrate the in-service or out-of-service condition of the readers 110, 120 by their set and reset states. The triggers 181, 182 are set by means of "OR" gates 183, 184, either simultaneously by a signal leaving the counter 175 or individually by means of "AND" gates 185, 186 having a first input connected to the output of the gates 153, 154 respectively and a second input connected to the output of a counter 180 emitting a signal when it has received three successive stepping pulses. The stepping on of this counter is ensured by the time base 6 by means of a "AND" gate 187 with four inputs, the first connected to the output $\tau_0$ of the time base 6, the second and the third respectively to the inoperative outputs of the triggers 181, 182, and the fourth to the output of an "OR" gate 188 likewise controlling the resetting of the counter 180 and having two inputs respectively connected to the outputs of the gates 153, 154. The resetting of the trigger 181 or 182 can only be effected manually by means of a set of contacts 189, some of which also permit their setting. The inoperative output of the trigger 181 is connected to an input of the gate 111, to inhibit inputs of the gates 115, 116 for the manual control of the reader 110, to an input of the gate 133, to an input of the gate 161, to an input of the gate 187 and to the output circuit 19. The inoperative output of the trigger 182 is connected to an input of the gate 121, to the inhibit inputs of the gates 125, 126, to an input of the gate 143, to an input of the gate 162, to an input of the gate 187 and to output circuit 19.

The operative output of the trigger 181 is connected, by means of the "OR" gate 135, to the inhibit input of the gate 112, by means of the "OR" gate 136, to an input of the gate 151, and by means of the "OR" gate 165 to the inhibit input of the gate 163 and to an input of each of the gates 161, 162.

Similarly, the operative output of the trigger 182 controls the gates 122, 151, 161, 162, 163 by means of "OR" gates 145, 146 and 165.

In addition, the outputs of the triggers 181, 182 control alarm devices, not illustrated, by means of gates $A_1$, $A_2$, $A_3$ representing respectively the set state of the one or the other of the triggers or both.

The output circuit 19 comprises two inhibit gates 191, 192, the outputs of which are connected to the transfer device 3 by means of an "OR" gate 190. The gate 191 is a gate with four inputs which ensures the transmission, to the transfer device 3, of the combination contained in the register 130, provided that the triggers 181 and 174 are reset and that the circuit 131 does not detect any odd-parity error. Similarly, the gate 192 has three inputs respectively connected to the output of the register 40 and to the inoperative outputs of the triggers 174, 182 and an inhibit input connected to the output of the circuit 141.

The operation of the sub-assembly 1 described above, for the reading and checking of the working programme is as follows:

As soon as a reading cycle is started, the gate 104 is released and the trigger 101 is reset because the trigger 102 is set. At the end of the reading of a programme block, the detection of the reference for the head of the following block by the circuits 132, 142 releases the gates 105, 106 by means of the gate 151 in such a manner that at the following moment $\tau_{0-\epsilon}$, the trigger 102 is reset and consequently blocks the gates 111, 121, which causes the stopping of the readers 110, 120. The sub-assembly 1 is then in a waiting condition which can be taken as an initial position. In this position, apart from the triggers 101, 102, the triggers 174, 177 of the reading-repetition circuit 17 and the triggers 181, 182 of the supervisory circuit 18 are reset because no request for repetition has appeared and the two readers 110, 120 are in service; the detectors for the reference of the head of a block 132, 142 each supply a signal to the gate 151 which releases the gates 105, 106. The arrival of a signal for the beginning of a reading cycle reaching the gate 101 either from the transfer device 3 or from the manually controlled contact sets the trigger 101 then the trigger 102 from the following pulse $\tau_{0-\epsilon}$ at the end of which the trigger 01 is reset.

Since the gates 111, 121 are open, because the trigger 174 on the one hand and the triggers 181, 182 on the other hand are reset, the readers 110, 111 advance at the rate of one step forwards for each pulse $\tau_0$ and each of the combinations read by each of them is recorded in the corresponding register 130 or 140. After the first step, since the reference combination for the head of the block has disappeared from these registers, the gates 151 and, consequently 105, 106 become blocked preventing the resetting of the trigger 102 like the trigger 101 by the pulses from the time base 6. So long as no combination gives rise to an error signal, the gates 161, 162, 163 remain blocked and the gates 191, 192 transmissive in such a manner that the successive combinations of the programme block are transmitted to the transfer device 3 until the detection of the reference for the head of the following block by the detectors 132, 142 again releases the gates 105, 106 to permit the resetting of the trigger 102 which blocks the gates 111, 121 and stops the advance of the readers 110, 120.

The checks for odd parity in the combinations recorded in the registers 130, 140 and for identity between them may reveal two kinds of occurrence. The occurrences of the first degree are those in which, when the two readers are in service and consequently the two trigger circuits 181, 182 are reset, one or the other of the odd-parity check circuits 131, 141 and the coincidence detector 150 supply an error signal simultaneously. In this case, the decoder 160 does not supply a signal and the error signal originating from one of the circuits 131 or 141 inhibits the corresponding output gate 191 or 192 in such a manner that the erroneous combination is not transmitted to the transfer device 3 which only receives the combination originating from the channel on which the odd-parity check is correct. Thus the operation of the whole is not interrupted, but the odd-parity error detected is demonstrated by signals appearing simultaneously over one of the wires 139 or 140 and over the wire 159.

The occurrences of the second degree are those in which, on the one hand, with the two channels in service, an odd-parity error appears over one of them or over both of them without an error in coincidence, an error in coincidence without an odd-parity error, or the two odd-parity errors and the coincidence error simultaneously, in which circumstances the decoder 160 supplies a reading repetition signal to the circuit 17 through the gate 163 which is then released and the gate 164, and on the other hand, only one of the channels being in service, an odd-parity error appears on this and causes, at the output of the corresponding gate 161 or 162 which is the only one of the three gates 161, 162, 163 which is then released, a reading repetition signal which is likewise applied to the circuit 17 by means of the gate 164.

The reading-repetition signal which passes through one or the other of the gates 171, 172 has the effect of setting the trigger circuit 174 which blocks the gates 191, 192, deletes in the transfer device 3 the combinations in the programme block being read which have already been transmitted thereto, blocks the gates 111, 121, releases the gates 112, 122, resets the trigger circuit 102, sets the trigger circuit 101, indicates the request for repetition by a signal over the wire 176 and steps on the counter 175 by one step.

If the combination which has given rise to a repetition signal is considered by detector 132, 142 of a channel, the reader of which is in service, as a reference for the head of a block, the signal leaving one or the other of the gates 133, 143 or both, inhibits the gate 171 and releases the gate 172 through which the trigger circuit 177 is set and, following it, the trigger circuit 174 while, at the same time, this situation forms the subject of special signalling over the wire 179.

If the combination which gave rise to a repetition signal does not give rise to any output signal from the gates 133, 143, that is to say, in the general case, if this combination is not a reference for the head of a block, said signal passes through the gate 171 and the trigger circuit 177 remains reset or is restored to this state by the gate 178 by means of the first pulse $\tau_5$ leaving the time base 6. Since the trigger circuit 144 is set and the trigger circuits 177, 181, 182 are reset, while the detectors 132, 142 are not providing a signal, the gates 112, 122 controlling the readers 110, 120 for backward runing, are open. Thus the pulses $\tau_0$ cause these readers to run backwards until a signal appears at the output of the reference detector 132, 142 of each of them. If there is no difference in phase between the punched tapes of the two readers, or if only one of them is in service, a signal passes through the gate 151, resets the trigger circuit 174 and sets the trigger circuit 102 in such a manner that the interrupted reading of the programme block in progress is resumed from the beginning.

If no error of the second degree is revealed in the course of the second reading of the programme block, this is completed normally at the appearance of the reference for the head of the following block and the signal for the start of the following reading cycle resets the reading-repetition counter 175 to zero.

In the opposite case, the second reading is interrupted like the first and the counter 175 steps on a second step. If this second reading, and a third, are interrupted in the same manner, the counter 175 emits a signal which sets the two trigger circuits 181 and 182 which blocks the four input gates 111, 112, 121, 122 and the two output gates 191, 192 and sets off a general alarm.

If the repetition request appears while at least one of the two detectors for the reference to the head of a block is supplying a signal, while the reading channel with which it is associated is in service, the setting of the trigger circuit 177 has the effect of blocking the gates 134, 144 in order to avoid the inhibition of the gates 112, 122 for the backward travel, then, when a first backward step of the two readers has caused the output signal to disappear from the detectors 132, 142, the trigger circuit 177 is reset at the following moment $\tau_5$ in such a manner that the detection of the reference for the head of the previous block stops the backward travel of the readers as in the previous case and this block is re-read in its entirety.

If a difference in phase occurs during the reading of the punched tapes in the normal direction, this difference in phase is manifested by a coincidence fault and the comparator 150 causes a request for a reading repeat. During the backward travel of the readers which results, the difference in phase is expressed by the appearance of a signal at the output of only one of the detectors 132, 142 and consequently one of the gates 134, 144. Thus the corresponding gate 112, 122 is blocked while the backward travel of the other reader remains permitted. The set of the gates 153, 154 shows this difference in phase and releases the gate 187 through which each pulse $\tau_0$ causes the counter 180 to move on by one step. If the agreement in phase is restored before the counter 180 has counted three pulses $\tau_0$, the two readers thus being brought back into phase, the reading repetition takes place as if there has been no difference in phase. In the opposite case, the trigger circuit 181 or 182 associated with the reader 110 or 120 which has not stopped at the reference for the head of a block is set by means of the gates 153, 185 or 154, 186. The result is an alarm $A_1$ or $A_2$, the blocking of the gate 133 or 143, the blocking of the gates 111, 112 or 121, 122, the release of the gates 115, 116 or 125, 126, the release of the gate 151, the blocking of the gate 187, the blocking of the gate 163 and the release of the gates 161, 191 or 162, 192 in such a manner that the reading channel which is in service continues to serve the transfer device 3 subject only to the condition that the combinations read respond correctly to the odd-parity check. After the reader which was out of service has been restored, this is brought back into phase with the reader in service by means of manual contacts controlling the advance of the punched tape forwards and backwards by means of gates 115 and 116 or 125 and 126 and finally by means of the manual contact which, by means of the gate 119 or 129, controls the forward travel of the tape as far as the first reference for the head of a block.

The various signals mentioned in the course of the above description enable the operation of the sub-assembly 1 to be supervised without its being interrupted and preventive intervention to be effected in order to maintain all its members in a satisfactory condition.

The sub-assembly 2 for the reading and checking of the co-ordinates is identical with the sub-assembly 1 except for the fact that its members corresponding to the detectors of the reference for the head of a block 132, 142 supply a signal not only when they detect the combination for the reference for the head of a block but also when they detect a combination known as a reference for the head of a sub-block. The programme of the horizontal co-ordinates of the satellites which are visible from the station is actually divided into blocks each comprising an address sub-block and a co-ordinate sub-block.

The address sub-block comprises:

The reference for the head of a block;

Six numerical combinations designating the moment of application of the co-ordinates expressed by the second sub-block;

Two numerical combinations designating the number of the satellite which these co-ordinates relate to.

The co-ordinate sub-block only comprises successive groups of numerical combinations designating respectively the acceleration, the velocity and the position in azimuth and in elevation of the satellite, as well as its distance and the difference in frequency of its permanent direction signal with respect to the nominal frequency of this signal.

Each sub-block is read in response to a signal for the beginning of reading originating either from the transfer circuit 4 or from a manual control as in the previous case and the differentiation between the references for the head of a block and a sub-block are only involved with regard to the subsequent processing of the addresses on the one hand and of the co-ordinates on the other hand.

Figure 3:
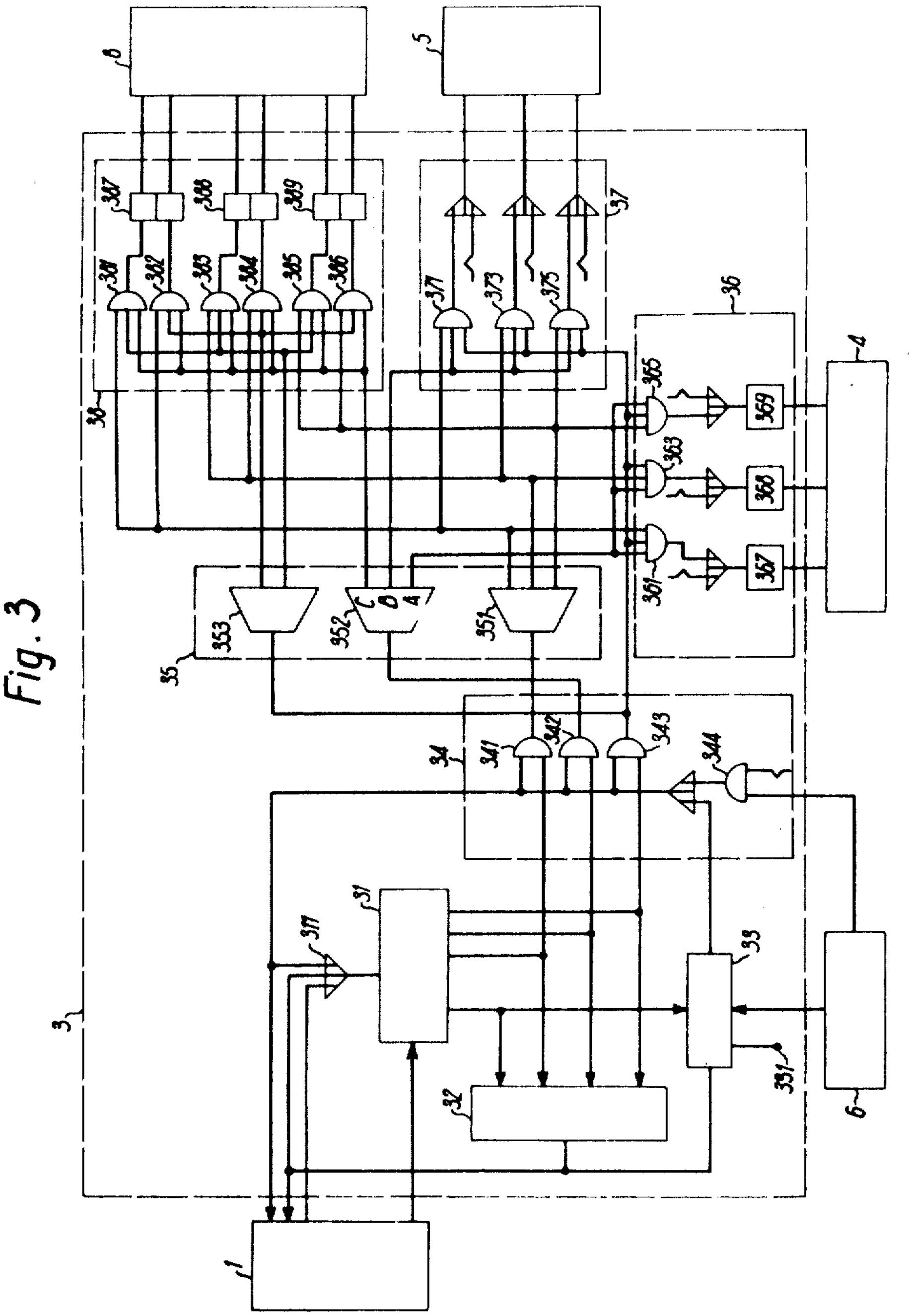
FIGURES 3 and 4 are functional diagrams of the devices for transferring, to the working members, the programmes read by the readers according to FIGURE 2.

FIGURE 3 is a functional diagram of the sub-assembly 3 associated with the sub-assembly 1 for the reading and checking of the working programme. The sub-assembly 3 consists essentially of a register 31 in which the programme blocks read are successively recorded, an odd-parity checking circuit 32, a detector 33 for coincidence between the time included in the recorded programme block and the time of the station given by the time base 6, a set of gates 34, a group of decoders 35 and three branch circuits 36, 37, 38 respectively serving the transfer sub-assembly 4, the switching equipment 5 and the aerial equipment 8.

As soon as a programme block is stored in the register 31 its various combinations are explored by the circuit 32, which, in the event of an odd-parity fault, blocks the circuit 33, sends a signal requesting the repetition of reading to the sub-assembly 1 and resets the register 31 to zero by means of an "OR" gate 311. This has two other inputs connected respectively to the operative output of the trigger circuit 174 of the reading-repetition circuit 17 and the output of the time coincidence detector 33.

If the odd-parity checks are satisfactory, each programme block, which is normally read in advance of the time which it contains, remains stored in the register 31 until the time coincidence signal supplied by the circuit 33. If this signal does not appear at the end of a predetermined delay, the circuit 33 transmits an alarm signal through a terminal 331 which leads to the intervention of an operator.

The time coincidence signal causes the transfer, through the set of gates 34, of the order contained in the programme block and the resetting of the register 31 to zero. It releases three sets of gates 341, 342, 343 which respectively apply, to the inputs of three decoders 351, 352, 353 in the group 35, the combinations representing the number of the aerial, the nature of the order, and the number of this. The group of gates 34 also comprises an "AND" gate 344 by means of which the operator can cause the transfer and the deletion of the order stored in the register 31 under the control of the time base 6.

The three outputs of the decoder 352 respectively control the branching of the orders A through the circuits 36 towards the sub-assembly 4, of the orders B through the circuit 37 towards the switching equipment 5 and of the orders C through the circuit 38 towards the aerial equipment 8. The decoder 351 has as many outputs as the station has tracking aerials which can be controlled by the aerial equipment 8, and connected to the ground network through the switching equipment 5. In order to avoid a useless complication of the drawings, these only illustrate the circuits corresponding to three tracking aerials it being understood that this number is in no way limiting and may be any. The three outputs of the decoder 351 respectively control the input gates 361, 363, 365 of the branching circuit 36, 371, 373, 375 of the branching circuit 37 and 381–383, 383–384, 385–386 of the branching circuit 38.

The output of the gate 343 is connected in parallel with one input of each of the gates 361, 363, 365, 371, 373, 375 and input of the decoder 353. This is illustrated as having only two outputs connected respectively to one output of each of the gates 382, 384, 386.

The outputs of the gates 361, 363, 365 are respectively connected to three registers 367, 368, 369 called satellite-acquisition registers, by means of "OR" gates which enable these registers to be controlled manually from the desk 7. The outputs of the gates 371, 373, 375 are respectively connected to three inputs of the switching equipment 5 by means of "OR" gates which enable the equipment 5 to be controlled manually from the desk 7. The outputs of the gates 381, 383, 385 are connected respectively to the setting inputs of the trigger circuits 387, 388, 389, the reset inputs of which are respectively connected to the outputs of the gates 382, 384, 386.

Thus, in the case of an order A for the acquisition of a satellite, the number of the satellite to be acquired is recorded in the register 367, 368 or 369 allocated to the aerial designated for this acquisition, in the case of an order B, the number of the ground connection to be connected to the designated aerial is recorded in a register associated with this aerial of the switching equipment 5, and in the case of an order C, each of the trigger circuits 387, 388, 389 causes the transmission members of the aerial with which it is associated to be brought into service or put out of serivce according to its condition.

Figure 4:
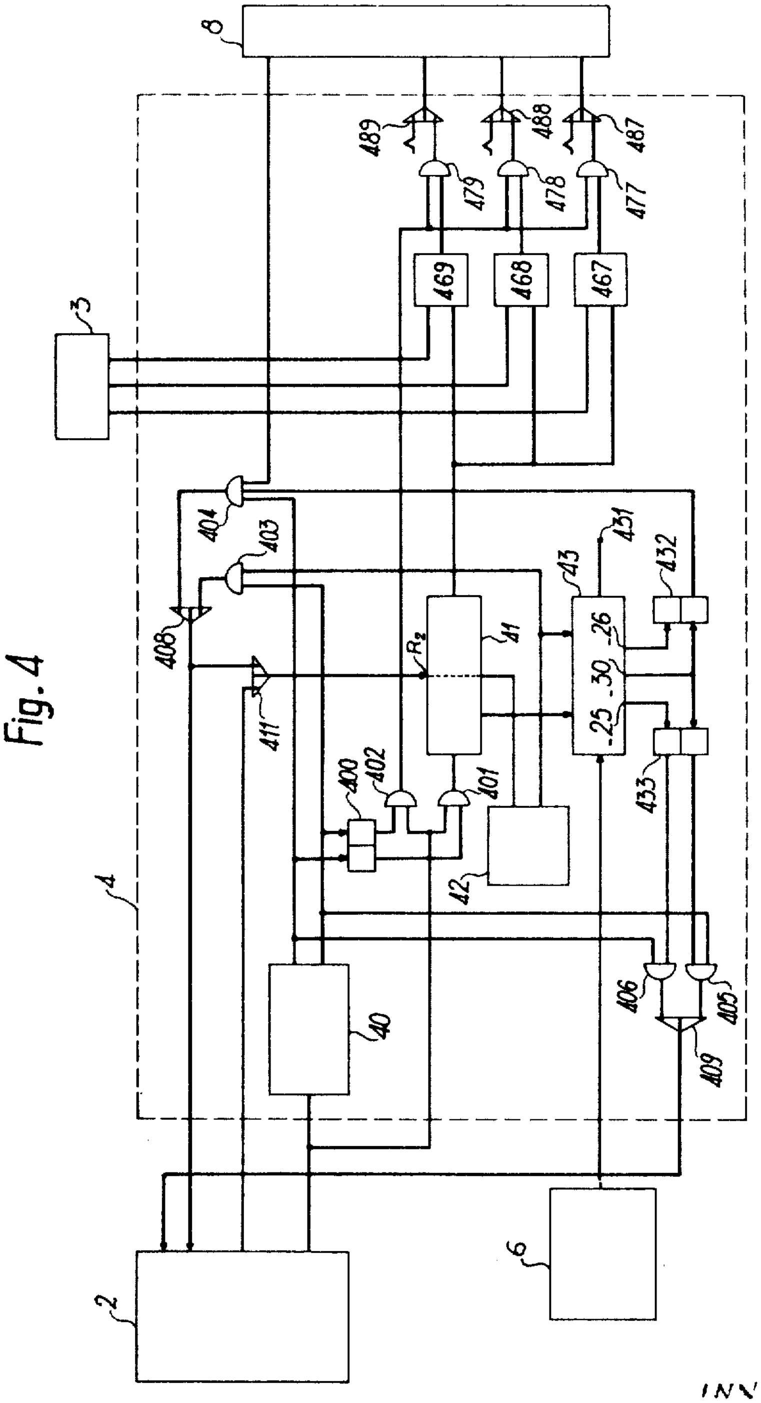

FIGURE 4 is a functional diagram of the sub-assembly 4 associated with the sub-assembly 2 for the reading and checking of the horizontal co-ordinates of the satellites visible from the station, in order to effect the transfer of these co-ordinates to the aerial equipment 8, under the control of the time base 6 and in conjunction with the sub-assembly 3. In the transfer sub-assembly 4, the odd-parity check only relates to the address sub-block, because the checking of the co-ordinates sub-block is effected much more efficiently by checking coherence at the level of the tracking equipment in the sub-assembly 8.

The information leaving the sub-assembly 2 is applied in parallel, to a selective detector 40 for reference signals for the head of a block on the one hand, for the head of a sub-block on the other hand and to two "AND" gates 401, 402 controlled by the two outputs of a trigger circuit 400, the inputs of which are connected to the outputs of the detector 40 in such a manner that the detection of a reference for the head of a block causes the opening of the gate 401 and the detection of a reference for the head of a sub-block, causes the opening of the gate 402.

The output of the gate 401 is connected to the input of a register 41 in which there is stored, for each block of the coordinate programme, the address sub-block namely the time when the co-ordinates contained in the second sub-block apply, and the number of the satellite to which they relate. The odd parity in the different combinations constituting these data is verified by scanning at the end of their recording by means of an odd-parity checking circuit 42, while the combinations constituting the time address are applied to a time comparison circuit 43 receiving the station time in the same form from the time base 6. The detection of an odd-parity fault causes the blocking of the time comparison circuit 43 and, by means of an "AND" gate 403, which is released at the end of the reading of an address sub-block, that is to say when the detector 40 detects a reference signal for the head of a co-ordinate sub-block, and of an "OR" gate 408 on the one hand, the application of a reading-repetition request signal to the sub-assembly 2, and on the other hand, by means of an "OR" gate 411, which is likewise connected to the deletion output of the sub-assembly 2, the application of a clearing signal to the register 41. The combinations stored in the register 41, which constitute the space address, that is to say the number of the satellite to be acquired, are applied, in parallel, to three concidence detectors 467, 468, 469, connected respectively on the other hand to the outputs of the satellite acquisition registers 367, 368, 369 of the sub-assembly 3. The outputs of the coincidence detectors 467, 468, 469 are connected respectively to the release inputs of the gates 477, 478, 479, the second inputs of which were connected in parallel to the output of the gate 402.

Since thirty seconds, for example, are necessary for the transmission of the co-ordinates of the satellite to be acquired and for the pointing of the designated aerial, the time comparison circuit 43 delivers three signals, respectively 30, 26 and 25 seconds before coincidence between the time of validity of the co-ordinates and the station time. Two trigger circuits 432 and 433 are simultaneously set, 30 second before the time coincidence and are reset, respectively 26 seconds and 25 seconds before this coincidence by the time comparison circuit 43. The operative and inoperative outputs of the trigger circuit 433 are respectively connected to the release inputs of "AND" gates 405, 406, the second inputs of which are respectively connected to the outputs for the detection of the reference for the head of a block and for the head of a sub-block of the detector 40. The outputs of the gates 405, 406 are connected through an "OR" gate 409 to the reading starting input of the sub-assembly 2. The inoperative output of the trigger circuit 432 is connected to one input of an "AND" gate 404, the second input of which is connected to the output for the detection of the reference for the head of a block of the detector 40 and the third input to an output of the aerial equipment 8, at which an error signal appears when the co-ordinate coherence check carried out at the level of the tracking equipment is not satisfactory. The output of the gate 404 is connected, at the same time as the output of the gate 403, by means of the "OR" gate 408, to the reading-repetition request input of the sub-assembly 2 and, by means of the gate 411, to the clearing input of the register 41.

When an address sub-black free of any odd-parity fault has been recorded in the register 41, the setting of the trigger circuit 433 thirty seconds before the time coincidence causes the release of the gate 405 and the reading of the co-ordinate sub-block by the sub-assembly 2. Since the trigger circuit 400 has been positioned by the detection of the reference for the co-ordinate sub-block, the data read are applied, through the gate 402, to three gates 477, 478, 479 in parallel and are transmitted, by which ever one of these gates is open, to pointing equipment of the aerial allocated to the designated satellite. "OR" gates 487, 488, 489, inserted between the outputs of the gates 477, 478, 479 and the corresponding inputs of the aerial equipment 8, permit manual control of these from the desk 7. When the reading of the co-ordinate sub-block is terminated, the detection of the reference for the head of the following block stops the operation of the sub-assembly 2 and, because the trigger circuit 432 has been set at the same time as the trigger circuit 433, releases the gate 404. If an error has been detected by the aerial equipment 8, the signal applied by this to the gate 404 causes a repetition of the reading of the co-ordinate sub-block by the sub-assembly 2 and the clearing of the register 41. In the opposite case, the gate 404 is closed 26 seconds before the time coincidence, and the resetting, 1 second later, of the trigger circuit 433 causes the starting of the reading of the following address sub-block. The change in state of the trigger circuit 400 following on the detection of the reference for the head of a block having caused the blocking of the gate 402 and the release of the gate 401, the new address is stored in the register 41, and the sub-assembly 2 continues its reading, provided there is no odd-parity error, until the reference for the head of a co-ordinate sub-block, the detection of which restores the assembly to the state taken above as being the initial state.

What we claim is:

1. A system of programmed working for a space telecommunication station using passing satellites comprising a plurality of tracking aerials, modulation channels connectable to said tracking aerials, a co-ordinate programme recorded chronologically in blocks, in duplicate on punched tapes, each of said co-ordinate blocks including the coordinates necessary for the acquisition of a given satellite visible from said station at a given moment, said coordinates being calculated at regular intervals with suitable staggering between satellites, a working programme recorded chronologically in blocks in duplicate on punched tapes, said working programme providing for the distribution of said co-ordinate blocks to said tracking aerials and for the switching over of said modulation channels, means for reading simultaneously in real time the two copies of each of said programmes, said reading means comprising for each copy a reader capable of travelling in both directions, parity check means associated with each of said readers, conformity check means associated with the readers of the two copies of each programme, means responsive to checks which reveal an operational defect in one reader of a given programme for causing this to be put out of service, an alarm signal and the continuation of the working by means of the other reader of said given programme and means responsive to checks which reveal an error of unidentified origin in a given block for causing a limited number of repetitions of the reading of the two copies of said given block and the setting off of an urgent alarm if the error is repeated on each fresh reading.

2. A system of programmed working according to claim 1 wherein each of said punched tapes comprises five tracks of which the fifth is used as a parity check.

3. A system of working according to claim 1 wherein said co-ordinate programme is read block by block, a sufficient time before the time of application of the co-ordinates expressed in each block for the satellite designated therein, to permit the acquisition of said satellite by the aerial prescribed in said working programme.

4. A system of worknig according to claim 1 comprising coherence check means for the co-ordinates transmitted to the tracking aerials and means responsive to any anomaly detected by said coherence check means for giving rise to a limited number of reading repetitions and, if the anomaly is repeated, to an urgent alarm.

5. A system of working according to claim 1 comprising a main desk which collects all the signals and alarms relating to the state of said station and the controls enabling the allocation of a satellite to an aerial to be effected manually, the transmission of the acquisition data to aerial equipment, and the switching over of said modulation channels.

References Cited

UNITED STATES PATENTS

| | | | |
|---|---|---|---|
| 3,015,817 | 1/1962 | Pastoriza | 343—7.3 |
| 3,079,522 | 2/1963 | McGarrell | 318—162 |
| 3,170,143 | 2/1965 | Royston | 340—172.5 |
| 3,177,472 | 4/1965 | Githens | 340—172.5 |
| 3,228,001 | 1/1966 | Herzl | 340—149 |
| 3,265,871 | 8/1966 | Willis | 235—150.27 |
| 3,292,157 | 12/1966 | Mellow | 340—172.5 |

ROBERT C. BAILEY, *Primary Examiner.*

RAULFE B. ZACHE, *Assistant Examiner.*

U.S. Cl. X.R.

340—146.3